United States Patent
Ouyang et al.

(10) Patent No.: US 12,462,084 B2
(45) Date of Patent: Nov. 4, 2025

(54) POWER ENVELOPE ANALYSIS FOR THE THERMAL OPTIMIZATION OF MULTI-CHIP MODULES

(71) Applicant: STATS ChipPAC Pte. Ltd., Singapore (SG)

(72) Inventors: Chien Ouyang, Pleasanton, CA (US); Xiao Gu, JiangSu (CN); Yonghyuk Jeong, Incheon (KR); Michael Mingliang Liu, Fullerton, CA (US)

(73) Assignee: STATS ChipPAC Pte. Ltd., Singapore (SG)

( * ) Notice: Subject to any disclaimer, the term of this patent is extended or adjusted under 35 U.S.C. 154(b) by 659 days.

(21) Appl. No.: 17/815,732

(22) Filed: Jul. 28, 2022

(65) Prior Publication Data

US 2024/0037308 A1 Feb. 1, 2024

(51) Int. Cl.
*G06F 30/30* (2020.01)
*G06F 17/16* (2006.01)
(Continued)

(52) U.S. Cl.
CPC .......... *G06F 30/373* (2020.01); *G06F 17/16* (2013.01); *G06F 30/367* (2020.01); *H01L 23/427* (2013.01); *H01L 25/162* (2013.01); *H01L 25/165* (2013.01); *G06F 2113/18* (2020.01); *G06F 2115/06* (2020.01); *G06F 2115/12* (2020.01); *G06F 2119/02* (2020.01); *G06F 2119/06* (2020.01); *G06F 2119/08* (2020.01); *G06F 2119/22* (2020.01);
(Continued)

(58) Field of Classification Search
CPC ...... G06F 30/373; G06F 17/16; G06F 30/367; G06F 2119/02; G06F 2119/06; G06F 2119/08
See application file for complete search history.

(56) References Cited

U.S. PATENT DOCUMENTS 6,853,944 B2 * 2/2005 Fan .................... G01K 7/01
374/E7.042
7,136,796 B2 11/2006 Jakatdar et al.
(Continued)

OTHER PUBLICATIONS

Wang et al., "A Novel Approach to Model and Analyze Uneven Temperature Distribution Among Multichip High-Power Modules and Corresponding Method to Respecify Device SOA", IEEE Transactions on Power Electronics, vol. 37, No. 4, Apr. (Year: 2022).*
(Continued)

*Primary Examiner* — Jack Chiang
*Assistant Examiner* — Brandon Bowers
(74) *Attorney, Agent, or Firm* — Brian M. Kaufman; Robert D. Atkins; PATENT LAW GROUP: Atkins and Associates, P.C.

(57) ABSTRACT

A semiconductor device is made by calculating a thermal resistance matrix for the semiconductor device. A plurality of maximum junction temperatures for the plurality of die of the semiconductor device is selected. A plurality of power envelope surfaces are calculated for the semiconductor device based on the thermal resistance matrix and the maximum junction temperatures. A plurality of powers is selected for the plurality of die. The plurality of powers are compared against the plurality of power envelope surfaces to determine a plurality of risk values.

25 Claims, 13 Drawing Sheets

(51) Int. Cl.
*G06F 30/367* (2020.01)
*G06F 30/373* (2020.01)
*H01L 23/427* (2006.01)
*H01L 25/16* (2023.01)
*G06F 113/18* (2020.01)
*G06F 115/06* (2020.01)
*G06F 115/12* (2020.01)
*G06F 119/02* (2020.01)
*G06F 119/06* (2020.01)
*G06F 119/08* (2020.01)
*G06F 119/22* (2020.01)
*H01L 23/00* (2006.01)

(52) U.S. Cl.
CPC .... *H01L 24/16* (2013.01); *H01L 2224/16225* (2013.01); *H01L 2924/1433* (2013.01); *H01L 2924/1437* (2013.01); *H01L 2924/1616* (2013.01); *H01L 2924/16196* (2013.01); *H01L 2924/16235* (2013.01); *H01L 2924/16251* (2013.01); *H01L 2924/1627* (2013.01); *H01L 2924/351* (2013.01); *H01L 2924/37001* (2013.01)

(56) References Cited

U.S. PATENT DOCUMENTS

| | | | |
|---|---|---|---|
| 7,194,711 | B2 | 3/2007 | Chandra |
| 7,472,363 | B1 | 12/2008 | Chandra |
| 7,823,102 | B2 | 10/2010 | Chandra et al. |
| 8,566,760 | B2 | 10/2013 | Pramono et al. |
| 9,323,870 | B2 | 4/2016 | Chandra |
| 2007/0098037 | A1* | 5/2007 | Hamann ............... G01K 7/425 374/E7.042 |
| 2007/0244676 | A1* | 10/2007 | Shang ................... G06F 30/23 703/2 |
| 2016/0124443 | A1* | 5/2016 | Reda ..................... G06F 1/203 700/282 |
| 2016/0239057 | A1* | 8/2016 | Kocagoez ........... G06F 11/3024 |
| 2023/0213583 | A1* | 7/2023 | Kakosimos .......... G05B 13/042 702/58 |
| 2024/0402772 | A1* | 12/2024 | Nandanwar ............. G06F 1/206 |

OTHER PUBLICATIONS

Je-Young Chang et al., "Estimating the Thermal Interaction between Mutiple Side by Side Chips on a Multi-Chip Package", Electronics Cooling, pp. 14-17, Jun. 2014.

* cited by examiner

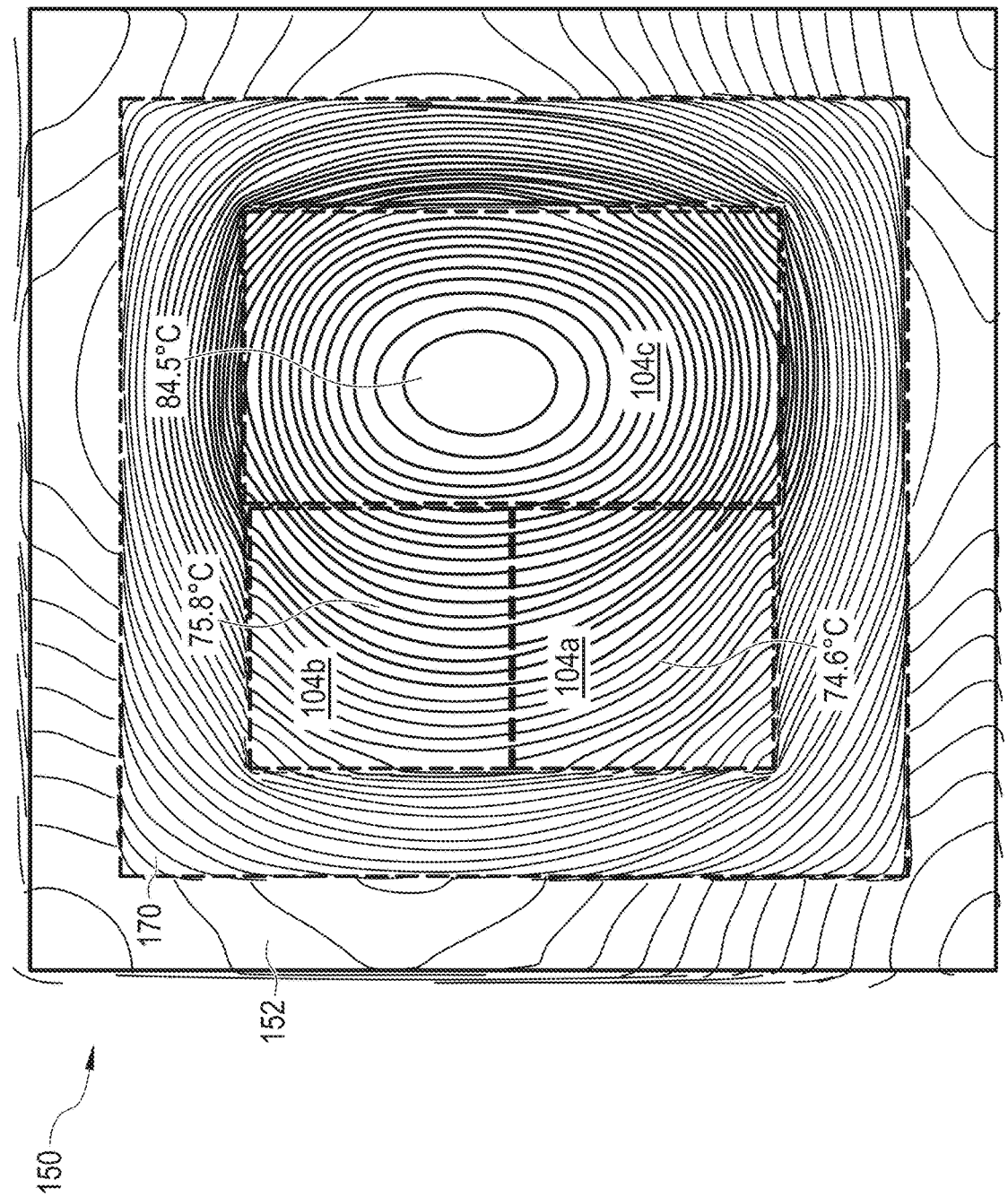

POWER ENVELOPE ANALYSIS FOR THE THERMAL OPTIMIZATION OF MULTI-CHIP MODULES

FIELD OF THE INVENTION

The present invention relates in general to semiconductor devices and, more particularly, to a semiconductor device and method of power envelope analysis for the thermal optimization of multi-chip modules.

BACKGROUND OF THE INVENTION

As Moore's law approaches the physical limit of the critical size of the chip, designers are looking to build devices in the vertical direction, namely out of the plane where the chip sits, using 2.5 D and 3D IC packaging solutions. Thermal management becomes critical and presents a design challenge when the power dissipation magnitudes and the level of complexity in package architectures increases. Exploring integrated thermal management from the package level to the board level is needed to ensure the performance and reliability of high-power components.

Chiplet modules, which divide a complex design, such as a high-end processor or a networking chip, into several small die instead of one large monolithic die, are a good alternative, especially for the data-center products because of the demanding computing performance and the consideration of the cost of design and manufacturing. By using two or more chips, designers can use different manufacturing nodes, which may be older nodes coupled with leading-edge nodes, to save cost and to achieve demanding computing performance. Advanced packaging solutions, together with chiplet technology, enable higher levels of integration and improve overall system performance. However, these benefits also result in challenges such as larger form-factor, low yield rate in the substrate, higher power, and increased thermal constraints.

For a module with only a monolithic die, a simulation tool can be used to calculate the junction temperature. After that, the thermal resistance of the package can be calculated considering the power magnitude and ambient temperature. The thermal resistance is a characteristic parameter of the package that can be used to predict the junction temperature of the package when the power or the ambient temperature is changed. When the die number in the package is more than one and the die have different power magnitudes, a single value of thermal resistance cannot explain the interactions of the die, and thermal characterization becomes much more challenging.

During the early-stage design of the chiplet module, the power magnitudes of die are to be determined or finalized, and a circuit designer may question if the selected or designed powers are within the safety range. With selected powers of die, a full thermal simulation may be used to predict the junction temperatures of the die such that the designers can check if the junction temperatures are over the maximum allowed limits. The drawback of this approach is that the focus is on the temperature and knowing how far the powers of die are over the limits is difficult. Moreover, doing a full thermal simulation for each proposed die power configuration is a computationally difficult task that quickly becomes unwieldy.

Therefore, a need exists for an improved semiconductor device and method for the thermal optimization of multi-chip modules.

BRIEF DESCRIPTION OF THE DRAWINGS

FIG. 4 illustrates thermal modelling of a chiplet module;

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings. The term "semiconductor die" as used herein refers to both the singular and plural form of the words, and accordingly, can refer to both a single semiconductor device and multiple semiconductor devices. The terms "semiconductor die" and "die" are used interchangeably.

Semiconductor devices are generally manufactured using two complex manufacturing processes: front-end manufacturing and back-end manufacturing. Front-end manufacturing involves the formation of a plurality of die on the surface of a semiconductor wafer. Each die on the wafer contains active and passive electrical components, which are electrically connected to form functional electrical circuits. Active electrical components, such as transistors and diodes, have the ability to control the flow of electrical current. Passive electrical components, such as capacitors, inductors, and resistors, create a relationship between voltage and current necessary to perform electrical circuit functions.

Back-end manufacturing refers to cutting or singulating the finished wafer into the individual semiconductor die and packaging the semiconductor die for structural support, electrical interconnect, and environmental isolation. To singulate the semiconductor die, the wafer is scored and broken along non-functional regions of the wafer called saw streets or scribes. The wafer is singulated using a laser cutting tool or saw blade. After singulation, the individual semiconductor die are mounted to a package substrate that includes pins or contact pads for interconnection with other system components. Contact pads formed over the semiconductor die are then connected to contact pads within the package. The electrical connections can be made with conductive layers, bumps, stud bumps, conductive paste, or wirebonds. An encapsulant or other molding material is deposited over the package to provide physical support and electrical isolation. The finished package is then inserted into an electrical system and the functionality of the semiconductor device is made available to the other system components.

Figure 1A:
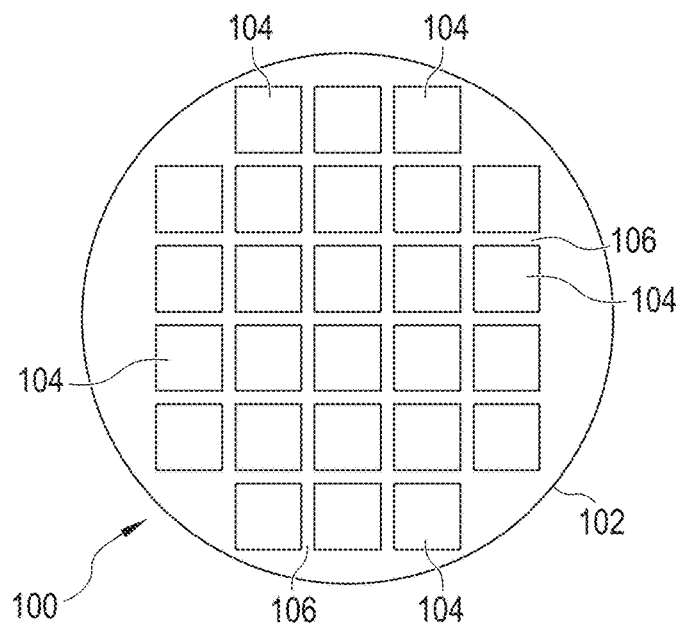
FIGS. 1a-1c illustrate a semiconductor wafer with a plurality of semiconductor die separated by a saw street.

FIG. 1a shows a semiconductor wafer 100 with a base substrate material 102, such as silicon, germanium, aluminum phosphide, aluminum arsenide, gallium arsenide, gallium nitride, indium phosphide, silicon carbide, or other bulk material for structural support. A plurality of semiconductor die or components 104 is formed on wafer 100 separated by a non-active, inter-die wafer area or saw street 106. Saw street 106 provides cutting areas to singulate semiconductor wafer 100 into individual semiconductor die 104. In one embodiment, semiconductor wafer 100 has a width or diameter of 100-450 millimeters (mm).

Figure 1B:
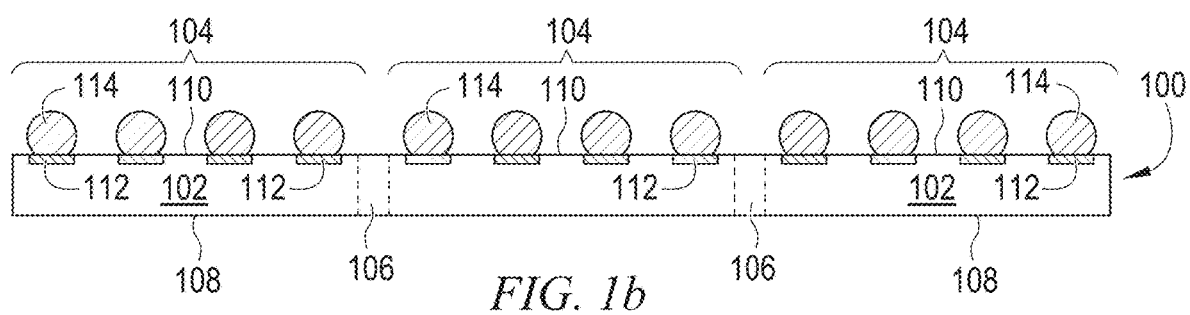

FIG. 1B shows a cross-sectional view of a portion of semiconductor wafer 100. Each semiconductor die 104 has a back or non-active surface 108 and an active surface 110 containing analog or digital circuits implemented as active devices, passive devices, conductive layers, and dielectric layers formed within the die and electrically interconnected according to the electrical design and function of the die. For example, the circuit may include one or more transistors, diodes, and other circuit elements formed within active surface 110 to implement analog circuits or digital circuits, such as digital signal processor (DSP), application specific integrated circuits (ASIC), memory, or other signal processing circuit. Semiconductor die 104 may also contain IPDs, such as inductors, capacitors, and resistors, for RF signal processing.

An electrically conductive layer 112 is formed over active surface 110 using PVD, CVD, electrolytic plating, electroless plating process, or other suitable metal deposition process. Conductive layer 112 can be one or more layers of aluminum (Al), copper (Cu), tin (Sn), nickel (Ni), gold (Au), silver (Ag), or other suitable electrically conductive material. Conductive layer 112 operates as contact pads electrically connected to the circuits on active surface 110.

An electrically conductive bump material is deposited over conductive layer 112 using an evaporation, electrolytic plating, electroless plating, ball drop, or screen printing process. The bump material can be Al, Sn, Ni, Au, Ag, Pb, Bi, Cu, solder, and combinations thereof, with an optional flux solution. For example, the bump material can be eutectic Sn/Pb, high-lead solder, or lead-free solder. The bump material is bonded to conductive layer 112 using a suitable attachment or bonding process. In one embodiment, the bump material is reflowed by heating the material above its melting point to form balls or bumps 114. In one embodiment, bump 114 is formed over an under bump metallization (UBM) having a wetting layer, barrier layer, and adhesive layer. Bump 114 can also be compression bonded or thermocompression bonded to conductive layer 112. Bump 114 represents one type of interconnect structure that can be formed over conductive layer 112. The interconnect structure can also use bond wires, conductive paste, stud bump, micro bump, or other electrical interconnect.

Figure 1C:
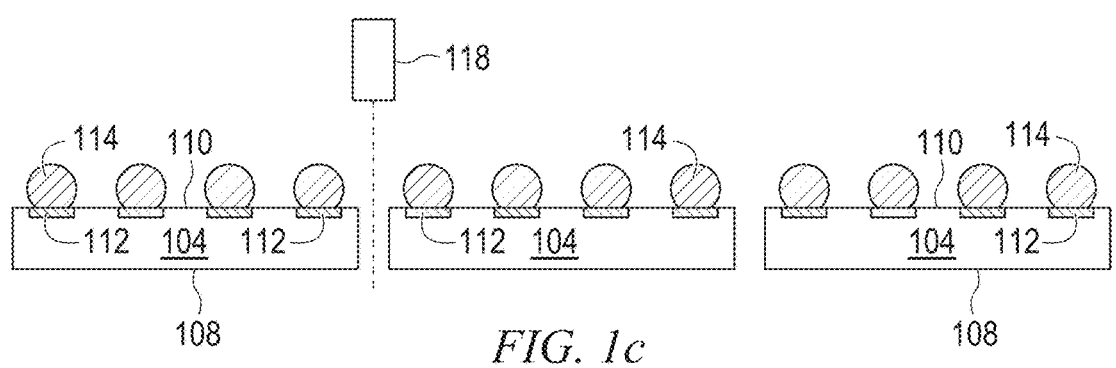

In FIG. 1c, semiconductor wafer 100 is singulated through saw street 106 using a saw blade or laser cutting tool 118 into individual semiconductor die 104. The individual semiconductor die 104 can be inspected and electrically tested for identification of known good die or unit (KGD/KGU) post singulation.

Figure 2A:
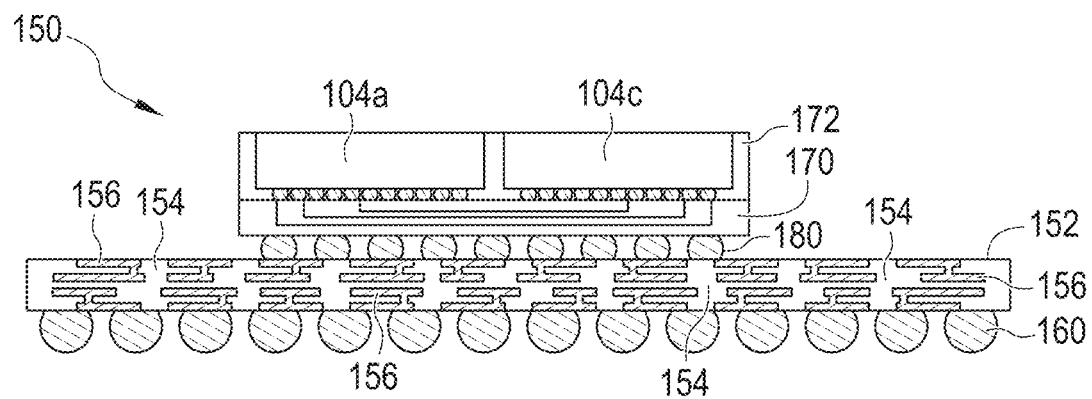
FIGS. 2a and 2b illustrate a chiplet module.
Figure 2B:
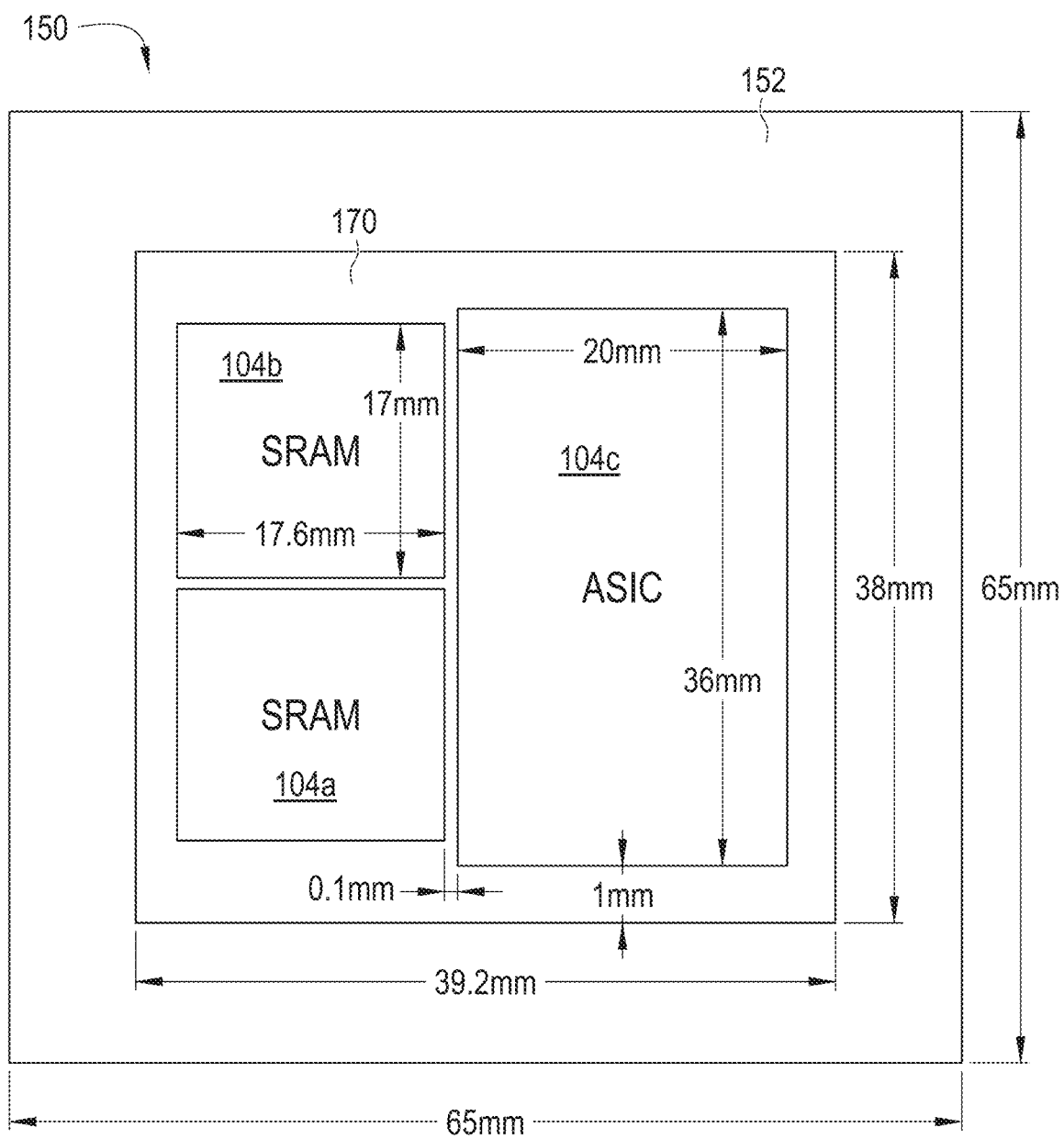

FIGS. 2a and 2b illustrate a chiplet module 150 made with a plurality of semiconductor die 104. FIG. 2a shows a cross-sectional view and FIG. 2b shows a plan view. Chiplet module 150 includes three semiconductor die 104a-104c. Semiconductor die 104a and 104b are static random-access memory (SRAM) chips used by semiconductor die 104c, which is an application-specific integrated circuit (ASIC). Semiconductor die 104a-104c are used as one example, but any number and type of semiconductor die can be used in chiplet module 150.

Chiplet module 150 is formed over a substrate 152. Substrate 152 includes one or more insulating layers 154 interleaved with one or more conductive layers 156. Insulating layer 154 is a core insulating board in one embodiment, with conductive layers 156 patterned over the top and bottom surfaces, e.g., a copper-clad laminate substrate. Conductive layers 156 also include conductive vias electrically coupled through insulating layers 154. Substrate 152 can include any number of conductive and insulating layers interleaved over each other. A solder mask or passivation layer can be formed over either side of substrate 152. Any suitable type of substrate or leadframe is used for substrate 152 in other embodiments. Solder bumps 160 or another suitable interconnect structure are mounted onto the bottom of substrate 152 for subsequent integration of chiplet module 150 into a larger electrical system.

Semiconductor die 104 in chiplet module 150 are disposed over an interposer 170. Interposer 170 can be a second substrate similar to substrate 152, or another type of substrate can be used to achieve a finer pitched interconnect, e.g., a glass or semiconductor substrate. Interposer 170 includes conductive layers and conductive vias to interconnect semiconductor die 104a-104c to each other and to substrate 152. Using interposer 170 results in chiplet module 150 being a 2.5 D package. A 3D chiplet module can be formed by stacking semiconductor die 104a and 104b on semiconductor die 104c. In other embodiments, a plurality of semiconductor die, e.g., semiconductor die 104a-104c, are mounted directly on substrate 152 side-by-side to form a more classic multi-chip module (MCM). A monolithic die paradigm incorporates all functions onto a single die mounted to substrate 152.

After mounting of semiconductor die 104 and any other desired electrical components onto interposer 170, the components are encapsulated by encapsulant or molding compound 172. Encapsulant 172 is deposited over interposer 170 and semiconductor die 104 using paste printing, compressive molding, transfer molding, liquid encapsulant molding, vacuum lamination, spin coating, or another suitable applicator. Encapsulant 172 can be polymer composite material, such as epoxy resin, epoxy acrylate, or polymer with or without a filler. Encapsulant 172 is non-conductive, provides structural support, and environmentally protects the semiconductor device from external elements and contaminants. Encapsulant 172 completely covers side surfaces of semiconductor die 104 and fills any gaps between substrate 152 and semiconductor die 104 unless a separate underfill is used. Encapsulant 172 can be deposited over semiconductor die 104 and then backgrinded to expose back surfaces of semiconductor die 104. Encapsulant 172 is typically deposited while interposer 170 remains as a wafer with multiple chiplet submodules formed at once, and then the interposer 170 wafer is singulated after encapsulation and before being mounted onto package substrate 152.

Solder bumps 180 are reflowed between interposer 170 and substrate 152 to mechanically and electrically connect the interposer to the substrate. Any type and number of components can also be mounted onto either the top surface of substrate 152 around interposer 170, the bottom surface, or both, and also embedded within the substrate in any suitable order and configuration.

During the early design stages of a chiplet module, the power magnitudes of die are to be determined or finalized, and a circuit designer may question if the selected or designed powers are within a safe range. To address these issues, a power envelope plot is used to help determine the allowed and optimized power magnitudes of the die. The power envelope plots refer to the 2D or 3D plots of die power magnitudes with respect to the allowed limits. The plots can be for example a 3D surface plot or a 2D histogram plot to indicate the risks of power magnitudes.

To demonstrate the use of power envelope plots to optimize the power magnitudes of the chips on chiplet module 150, FIG. 2b illustrates a simple configuration of a 2.5 D interposer chiplet module 150 with an outline dimension of 65 mm by 65 mm. The size of the ASIC die 104c is 20 mm by 36 mm, and there are two SRAM chips 104a and 104b, and each SRAM chip size is 17 mm by 17.6 mm. The detailed dimensions of the chips are shown in FIG. 2b. The electrical, manufacturing, and design factors are carefully considered to define the dimensions.

Figure 3A:
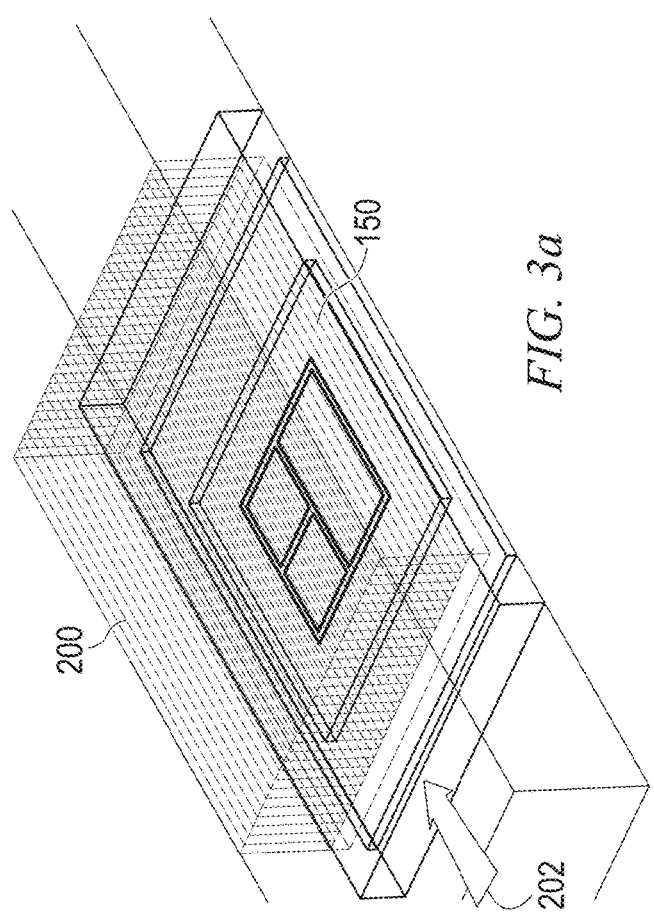
FIGS. 3a and 3b illustrate thermal testing of a chiplet module.

To demonstrate the application of power envelope plots to evaluate the risks of chiplet module 150, the chiplet module was assumed to be placed inside a simplified 1 U server rack 200, as shown in FIG. 3a. The applied power on the ASIC die is 150 watts and each SRAM has 32 watts. The outside ambient temperature was set at 30° C., and the flow rate of this forced convection 1 U server rack, as indicated by arrow 202, was 20 cubic feet per minute.

Figure 3B:
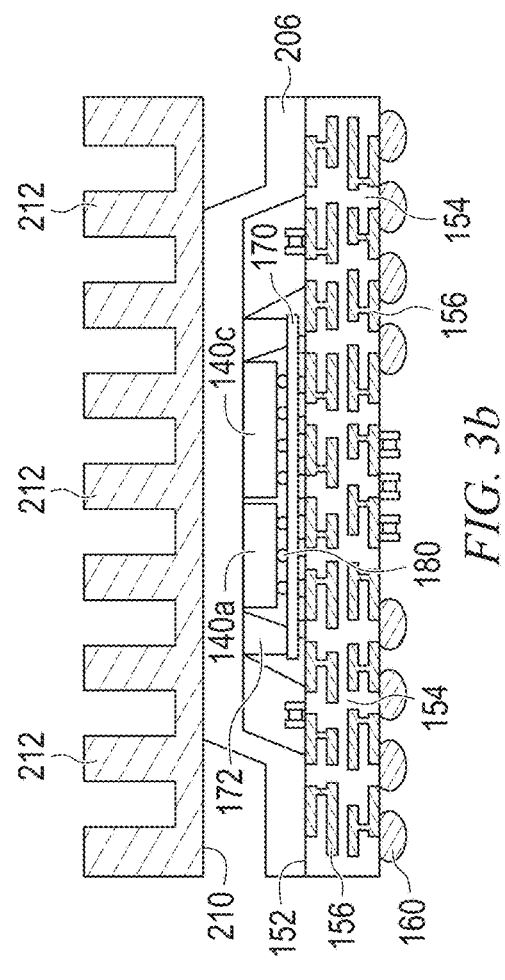

As shown in FIG. 3b, a lid or heat spreader 206 is disposed over chiplet module 150 in physical contact with the top surfaces of semiconductor die 104. A heatsink 210 is disposed on the heat spreader. A thermal interface material may be disposed between semiconductor die 104 and heat spreader 206, and between the heat spreader and heat sink 210, as desired. The in-plane heat sink 210 size is about 107 mm by 78 mm, and there are 33 aluminum fins 212 with a height of 20 mm in the out-of-plane direction.

The above selection of the configuration and the parameters, although not to reflect the real server setup, is to mimic the real-world applications, based on a system condition. FIG. 4 is a detailed temperature contour plot at the bottom of the die to illustrate the temperature gradients across chiplet module 150. A commercial electronics cooling simulation software, which is finite volume-based, was used. Other simulation software is used in other embodiments.

Figure 5A:
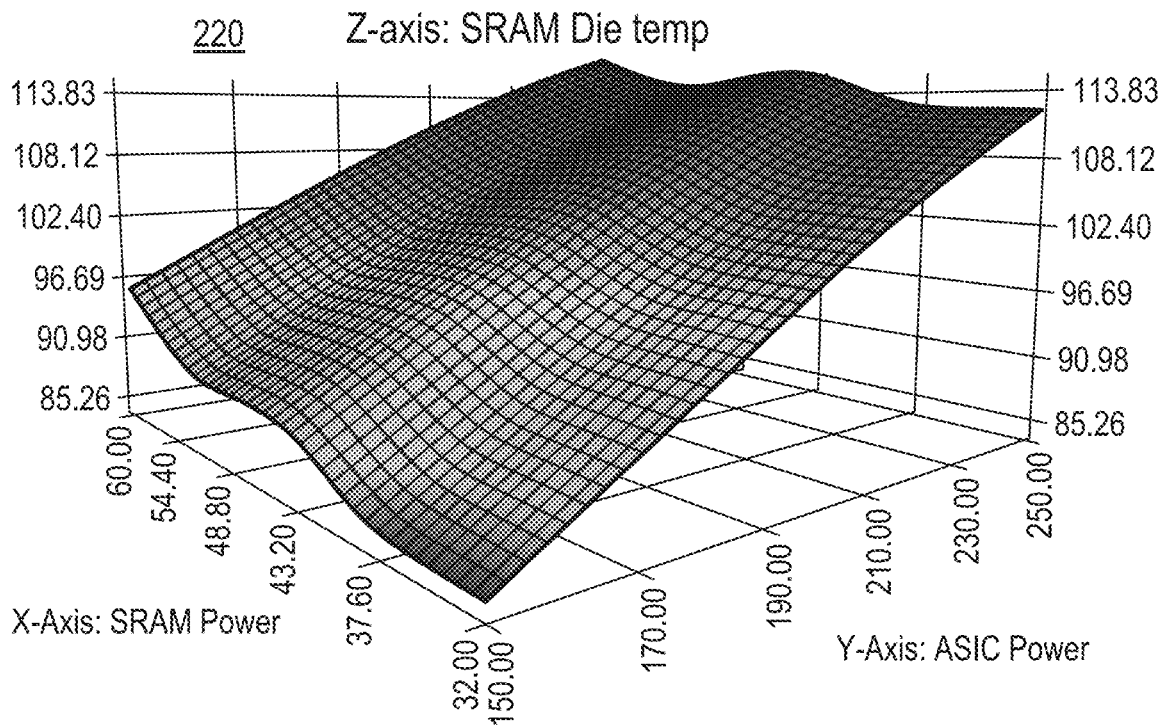
FIGS. 5a and 5b illustrate 3D plots of die junction temperature over three die having two different powers.
Figure 5B:
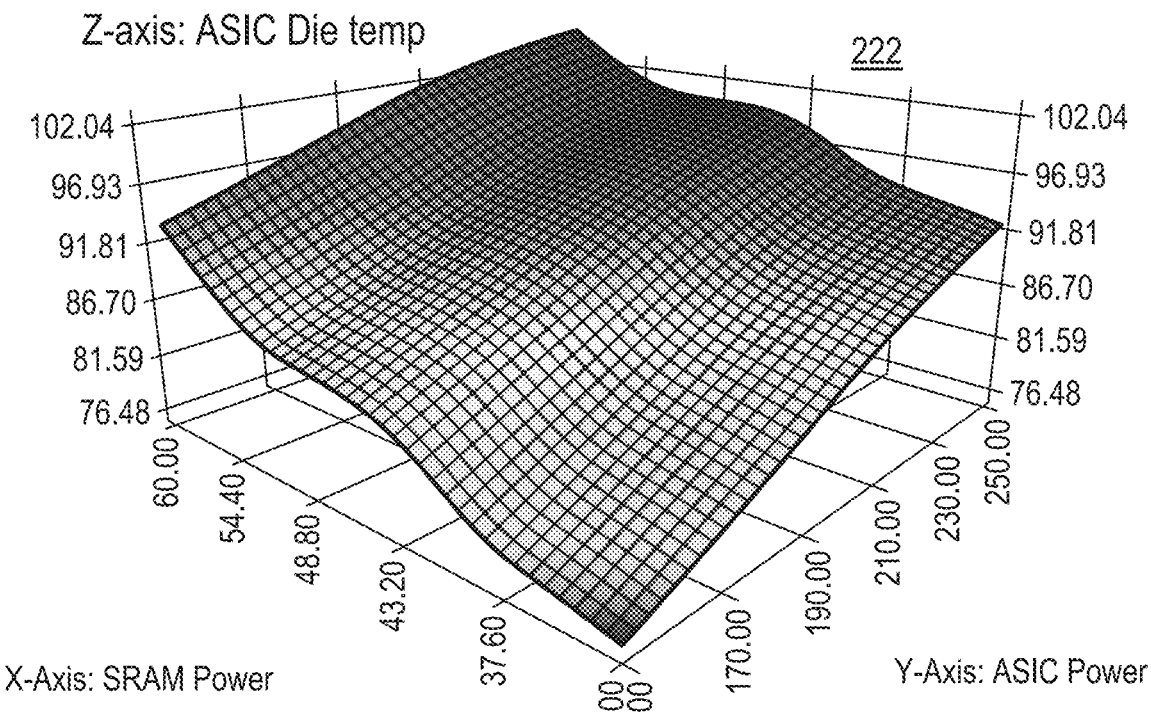

From a thermal perspective, the junction temperature of each chip is one of the most important parameters to evaluate if chiplet module 150 is reliable or not. To evaluate the thermal reliability, the prior art approach is to do a series of simulations to determine the range of junction temperatures as a function of the power magnitudes of die, and ideally, the distribution of junction temperatures may be indicated with a three-dimensional contour plot for easy viewing. FIGS. 5a and 5b show one example of using the 2.5 D interposer configuration stated earlier to generate such plots.

In FIGS. 5a and 5b, the powers of ASIC and SRAM die are the variables on the x and y-axes. The two SRAM die are assumed to have the same power magnitudes. The junction temperature of the ASIC die in plot 220 of FIG. 5a is affected by the applied powers, and the curved surface in the z-direction clearly indicates the temperature distribution of the ASIC die such that the designers are able to determine where the safe and risky power magnitudes of ASIC and SRAM die. FIG. 5b shows plot 222 with the z-axis being changed to the junction temperature of the ASIC die.

During the early stage of designing chiplet module 150, the designer may use the temperature plots such as FIGS. 5a and 5b to determine if the power magnitudes of chips are within the safe region. However, the first issue is that the powers of two SRAM die in the figures were kept the same in order to generate the curved surface plot of die temperature. If the two SRAM die have different powers, a four-dimensional curved surface plot will be needed, but unfortunately, the four-dimensional plot cannot be easily displayed in a two-dimensional form for viewing. The problem compounds if more than three die are used. The second problem is that the temperature data on the curved surface plot does not provide designers the information of optimized powers, and it is not practical to generate many curved surface temperature plots as a function of different powers of die because of the computational resources required to do so.

Instead, a thermal resistance model can be used. Equation (1) below shows a generic implementation of the thermal resistance model.

$$\begin{bmatrix} \theta_{11} & \cdots & \theta_{1n} \\ \vdots & \ddots & \vdots \\ \theta_{m1} & \cdots & \theta_{mn} \end{bmatrix} \begin{bmatrix} P_{11} \\ \vdots \\ P_{n1} \end{bmatrix} < \begin{bmatrix} T_{j1} - T_a \\ \vdots \\ T_{jn} - T_a \end{bmatrix} \quad \text{Equation (1)}$$

In Equation (1), the $[\theta_{11} \ldots \theta_{mn}]$ matrix is the thermal resistance matrix, where m and n are the number of die in the package being analyzed. The $[P_{11} \ldots P_{n1}]$ matrix is the power rating in watts for the n number of die. The $[T_{j1} - T_a \ldots T_{jn} - T_a]$ matrix is the temperature delta ($\Delta$T) for each of the n number of die between the junction temperature ($T_j$) and ambient temperature ($T_a$).

In order to calculate the thermal resistance matrix, several sets of power magnitudes will be input, each having a small perturbation from the standard power loadings. One example with chiplet module 150 having one ASIC and two SRAM die would be to vary the power magnitudes as per Table 1 below. Case 1 is our normal power loading, and cases 2 and 3 are the perturbed power magnitudes of die. The selection of powers are different from the normal ones for the purpose of matrix calculation.

TABLE 1

Chip Powers Used to Calculate Thermal Resistance Matrix

| Power (Watts) | Case 1 | Case 2 | Case 3 |
|---|---|---|---|
| ASIC Die 104c | 150 | 130 | 170 |
| SRAM Die 104b | 32 | 22 | 17 |
| SRAM Die 104a | 32 | 15 | 24 |

Simulation software is used to calculate simulated junction temperatures $T_{j1}$ through $T_{j3}$ for each of the die in each of the three power loading cases from Table 1. Table 2 below shows exemplary simulated $\Delta T_j$ values of each die in the above three cases, using an ambient temperature of 30° C. subtracted from each calculated T

TABLE 2

Simulated Junction Temperature Deltas

| $\Delta T_J$ (° C.) | Case 1 | Case 2 | Case 3 |
|---|---|---|---|
| ASIC Die 104c | 54.735 | 44.07 | 56.41 |
| SRAM Die 104b | 45.961 | 34.97 | 42.1 |
| SRAM Die 104a | 44.669 | 32.64 | 42.18 |

With three power loading cases on the die from Table 1 and the simulated junction temperatures of the die from Table 2, the maximum allowed thermal resistance matrix can be calculated using Equation (1). Solving for the $\theta$ matrix results in the following three formulae 2, 3, and 4. An equals operator is used instead of an inequality operator.

$$\begin{bmatrix} \theta_{11} \\ \theta_{12} \\ \theta_{13} \end{bmatrix} = \begin{bmatrix} 54.735 \\ 44.07 \\ 56.41 \end{bmatrix} \times \begin{bmatrix} 150 & 32 & 32 \\ 130 & 22 & 15 \\ 170 & 17 & 24 \end{bmatrix}^{-1} \quad \text{Equation (2)}$$

$$\begin{bmatrix} \theta_{21} \\ \theta_{22} \\ \theta_{23} \end{bmatrix} = \begin{bmatrix} 45.961 \\ 34.97 \\ 42.1 \end{bmatrix} \times \begin{bmatrix} 150 & 32 & 32 \\ 130 & 22 & 15 \\ 170 & 17 & 24 \end{bmatrix}^{-1} \quad \text{Equation (3)}$$

$$\begin{bmatrix} \theta_{31} \\ \theta_{32} \\ \theta_{33} \end{bmatrix} = \begin{bmatrix} 44.669 \\ 32.64 \\ 42.18 \end{bmatrix} \times \begin{bmatrix} 150 & 32 & 32 \\ 130 & 22 & 15 \\ 170 & 17 & 24 \end{bmatrix}^{-1} \quad \text{Equation (4)}$$

Solving for theta gives the thermal resistance matrix in equation (5), which has die power as its only remaining variable. The values of $\Delta T_1$-$\Delta T_3$ are fixed at 95 because the desired maximum $T_J$ for each die is 125° C. with an ambient temperature of 30° C.

$$\begin{bmatrix} 0.28818533 & 0.173129524 & 0.18647 \\ 0.1796696 & 0.385964571 & 0.208115 \\ 0.1739064 & 0.188766857 & 0.391953 \end{bmatrix} \begin{bmatrix} P_1 \\ P_2 \\ P_3 \end{bmatrix} < \begin{bmatrix} 95 \\ 95 \\ 95 \end{bmatrix} \quad \text{Equation (5)}$$

Inputting the power of all three die $P_1$-$P_3$ in a proposed configuration will allow determination of whether the configuration is safely within allowable thermal limits. If equation (5) evaluates properly, then the configuration is safe. If equation (5) evaluates incorrectly, then the die power configuration is above the desired limits.

Figure 6A:
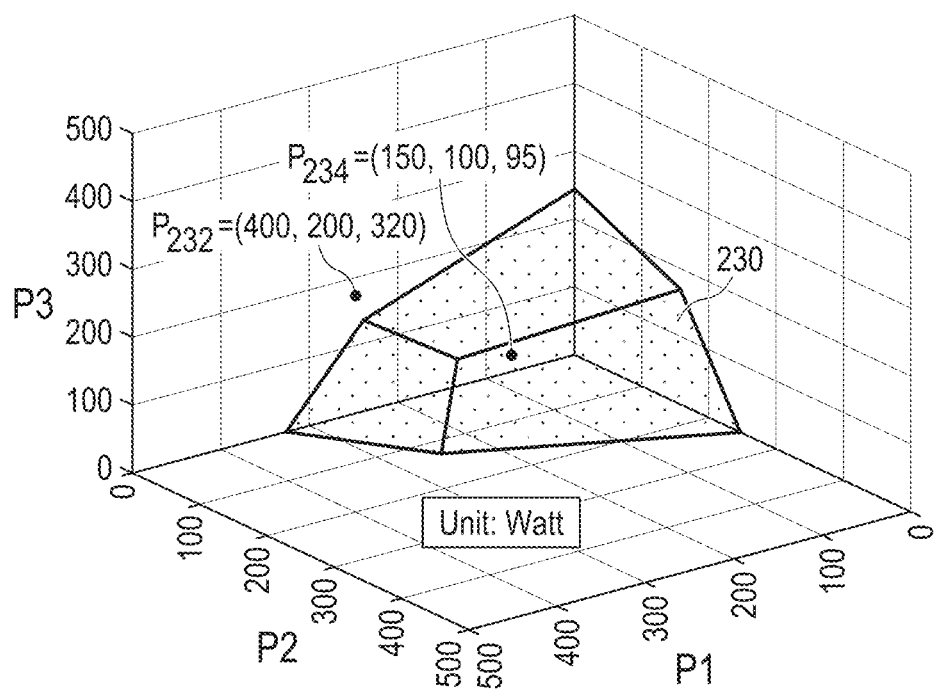
FIGS. 6a-6c illustrate a power envelope analysis of a three-die chiplet module.

Equation (5) clearly states the maximum allowed power magnitudes on the die. FIG. 6a shows a power envelope surface plot 230 of the three power magnitudes on the X, Y, and Z axes. The three surfaces of power envelope plot 230 are the "thresholds" or "bounds" of power magnitudes. Each surface in FIG. 6a is generated by treating a respective line of Equation (5) as a separate linear equation and then graphing the formula as a plane in 3D space. For example, the plane based on the first line of Equation (5) would be defined by the equation 0.28818433x+0.173129524y+0.18647z=95.

The three planes, one for each line when a three-die configuration is used, in combination define a power envelope plot. A point beneath the power envelope plot is in general safe while a point above the surface plot may cause the chiplet module to be risky thermally. A set of power magnitudes, which is the dot labelled $P_{232}$=(400, 200, 320) in FIG. 6a, is selected to demonstrate that the select powers of point $P_{232}$, 400 watts, 200 watts, and 320 watts, are over the allowed power limits. This visual illustration of the dot position on the power envelope plot is very intuitive for circuit designers to know if their select powers are within the safe region. Alternatively, the powers for the three die could have simply been plugged into equation (5) and evaluated mathematically.

Figure 6B:
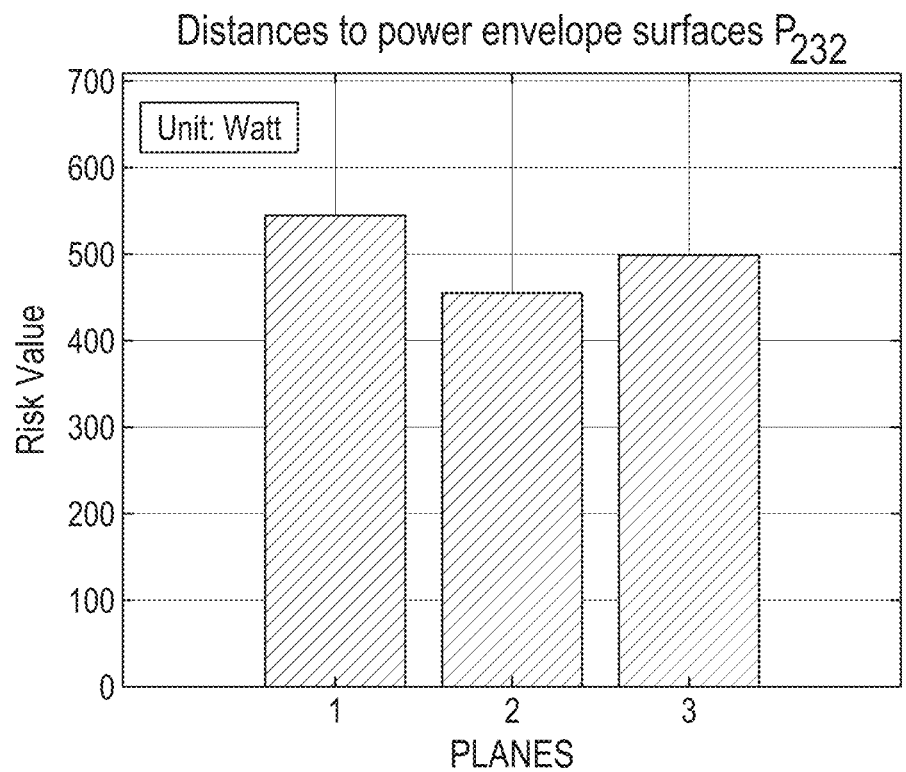

In addition to the visual illustration of selected power magnitudes on power envelope plot 230, one important question is how far the power magnitudes are away from the threshold, which are the power differences to the bounded surfaces. The distances to the bounded surfaces are defined as "Risk Values" and are illustrated in FIG. 6b. The positive risk values indicate that the powers are over the limits of the specifications and the chiplet modules are not safe thermally, and there are risks of die in real applications.

Figure 6C:
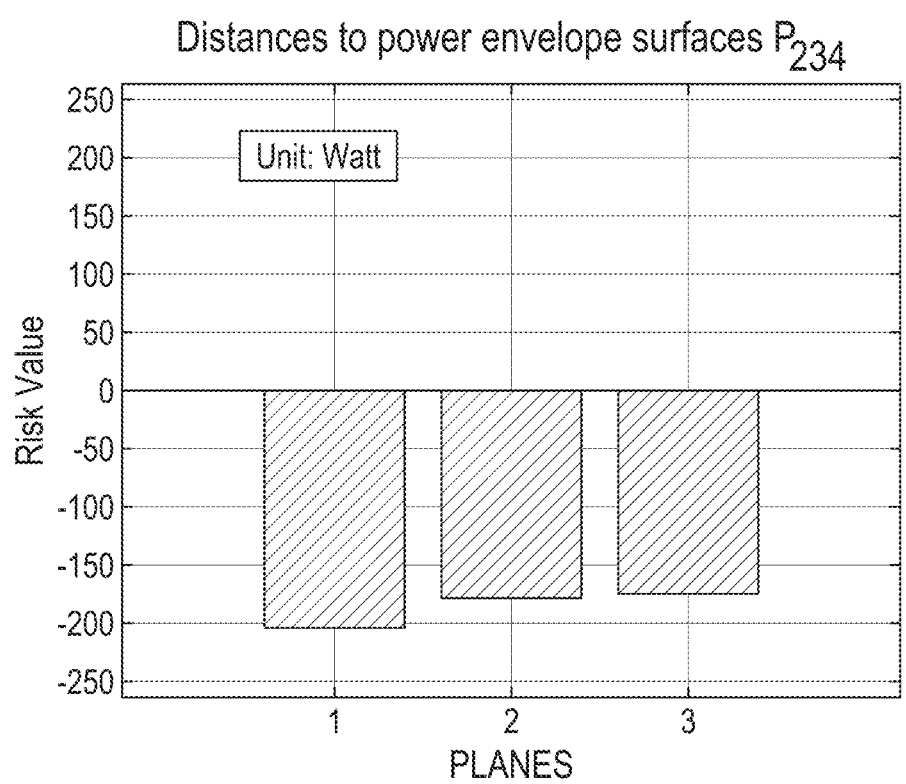

Point $P_{234}$ selects another set of powers, 150 watts, 100 watts, and 95 watts, from the die and the dot is beneath the bounded surfaces. The corresponding risk values of the selected set of powers to the bounded surfaces are shown in FIG. 6c, and the negative risk values indicate that the powers are safe. Positive risk values mean the power magnitudes are over the limits and the chiplet module is not safe thermally, while negative risk values indicate the power magnitudes are lower than the allowed specifications and the chiplet module is safe to use.

When there are three die, the power envelope plots can be visualized easily with 3D power envelope surfaces, for example plot 230 in FIG. 6a. When there are more than 3 die, such as 7, 9, or 10 die, plotting the bounded surfaces in the three-dimensional world becomes challenging. Fortunately, the mathematical calculation of the matrix is still the same for any number of die, and Equation (6) below is one example of an equation usable with a chiplet module having 5 die.

$$\begin{bmatrix} 0.265564919 & 0.197103394 & 0.142204003 & 0.154482715 & 0.180123798 \\ 0.15820019 & 0.632770511 & 0.103075618 & 0.16885732 & 0.138543107 \\ 0.158223531 & 0.178159183 & 0.570817679 & 0.098800762 & 0.191810581 \\ 0.155588926 & 0.205967665 & 0.092977652 & 0.578317298 & 0.140531183 \\ 0.155707781 & 0.150775696 & 0.157132653 & 0.108798851 & 0.596006638 \end{bmatrix} \begin{bmatrix} P_1 \\ P_2 \\ P_3 \\ P_4 \\ P_5 \end{bmatrix} < \begin{bmatrix} 95 \\ 95 \\ 95 \\ 95 \\ 95 \end{bmatrix} \quad \text{Equation (6)}$$

Figure 7:
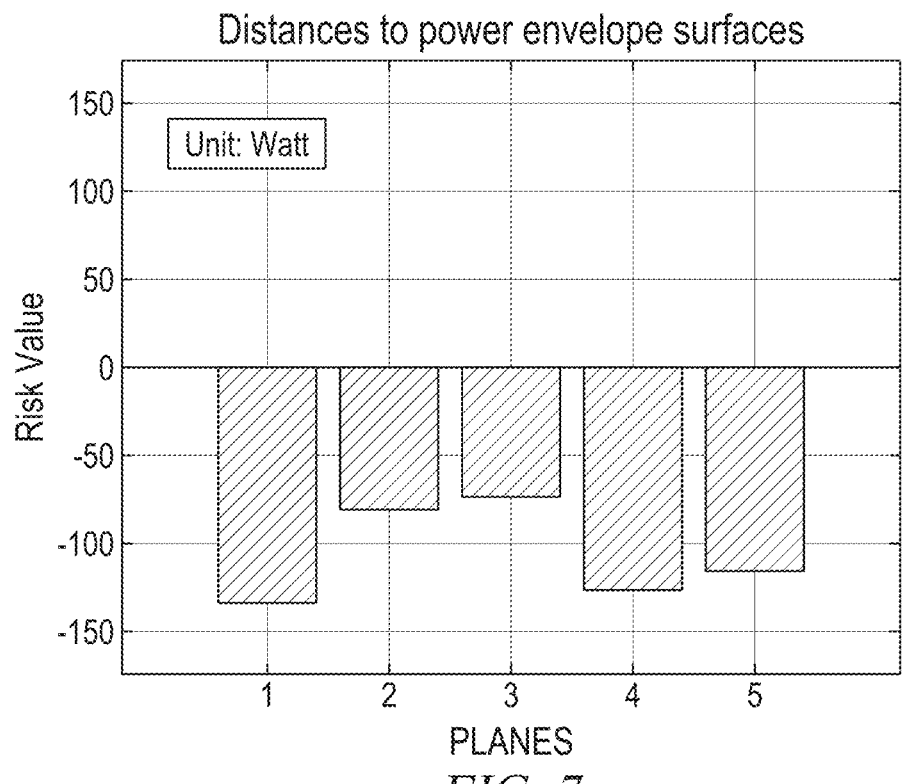
FIG. 7 illustrates power envelope analysis of a five-die chiplet module.
Figure 8:
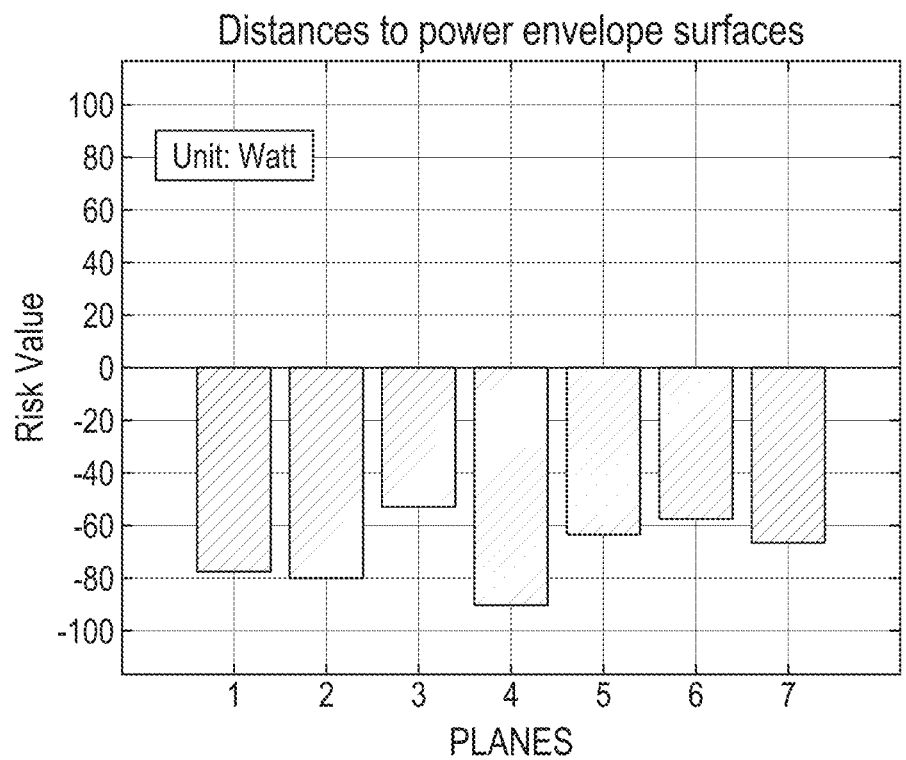
FIG. 8 illustrates power envelope analysis of a seven-die chiplet module.

Given five proposed powers for five die in a chiplet module, the risk values of the selected powers to the five bounded surfaces can be calculated, and FIG. 7 illustrates the result. For the case in FIG. 7, the selected powers of 5 die are 90, 23, 10, 90, and 80 watts. The selected powers of the die result in negative risk values, so the module is safe to use. FIG. 8 further illustrates a chiplet module having 7 die and the analysis of the power envelope approach is still applicable. Theoretically, the number of die on the chiplet is not limited and the same thermal resistance matrix approach can be used to do the analyses for any number of die.

With the calculated risk values to the power envelope surfaces, we can evaluate if the power of the die on the chiplet module is over the specification limit or not. In addition to the multiple risk values as shown in previous figures, there are options to combine all the risk values for each plane into a single effective risk value which may be easier to implement for reliability evaluation. One option is to sum up the risk values with equation (7) below.

$$R_{eff} = \sqrt{c_1 \times (r_1)^2 + c_2 \times (r_2)^2 + c_3 \times (r_3)^2 + ...}$$ Equation (7)

In Equation (7), c1, c2, and c3 are optional weighting scales, which can be set equal to one if all individual risk values are to be treated equally. The r1, r2, and r3 in Equation (7) are the risk values to individual power envelope surfaces, and $R_{eff}$ is the final effective risk value. In real applications, the weighting scales may need to be determined considering the thermal, mechanical, and material properties, and also the manufacturing processes of silicon components. Some experimental data may be needed to select appropriate weight scales. The background of Equation (7) is to provide circuit designers with a simple and quick way of knowing the overall thermal reliability of a chiplet module. The weighting scales can be developed to match experimental data.

Figure 9A:
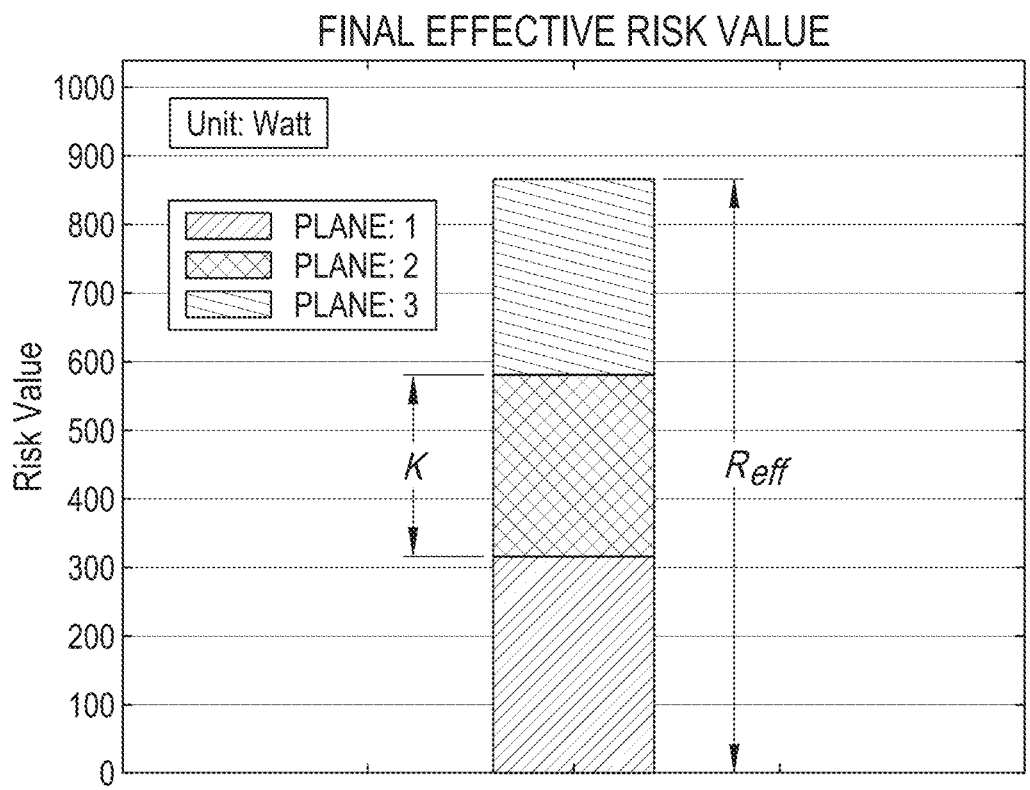
FIGS. 9a and 9b illustrate combined risk values for chiplet modules.
Figure 9B:
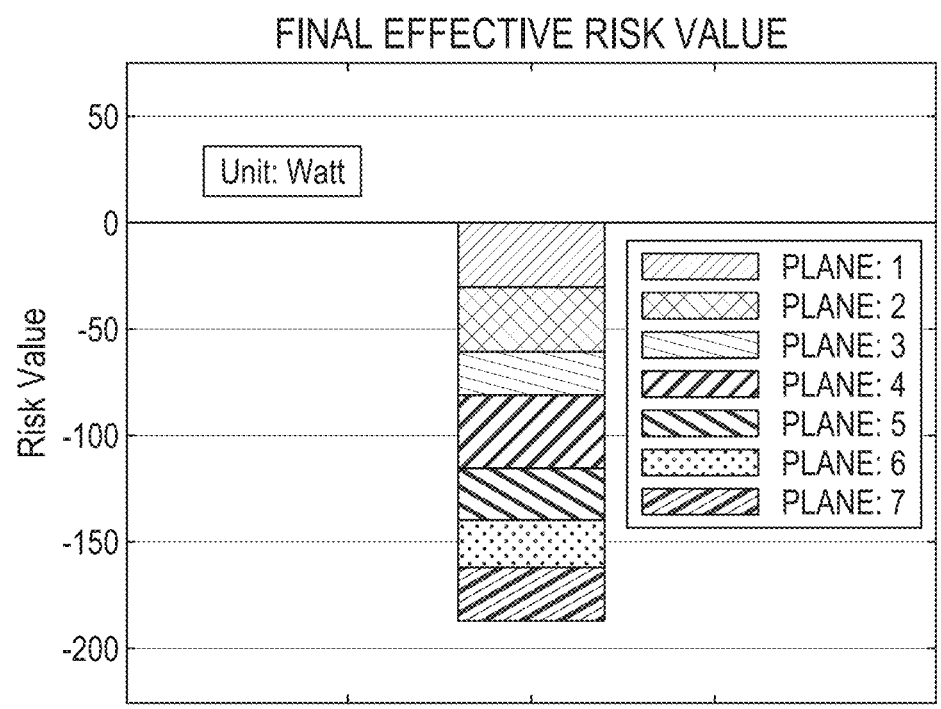

The effective risk values of previous cases with 3 and 5 die are illustrated in FIGS. 9a and 9b, respectively. FIG. 9a matches the example from FIG. 6b, while FIG. 9b matches the example from FIG. 7. The weighting scales may be changed to be not equal to one if we like to treat die differently. With the effective risk value, users may be able to compare different sets of powers applied to the die on the chiplet module with a single effective value. The different sections in the plots of FIGS. 9a and 9b illustrate the percentage of risk value corresponding to each plane.

For the example in FIG. 9a, the value K of plane 2 is given by Equation (8). The height or length of each section is an important indicator because it shows the magnitude of impact for each individual die on the final effective risk value.

$$K = \frac{d_2 \times R_{eff}}{d_1 + d_2 + d_3}$$ Equation (8)

Figure 10A:
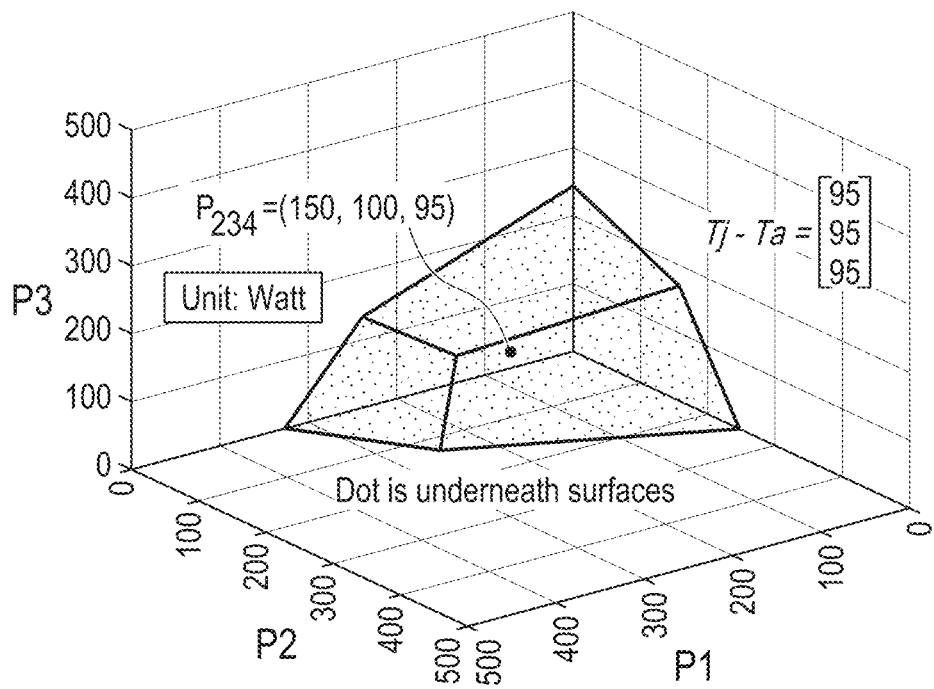
FIGS. 10a and 10b illustrate changing the maximum allowed temperature for the die.
Figure 10B:
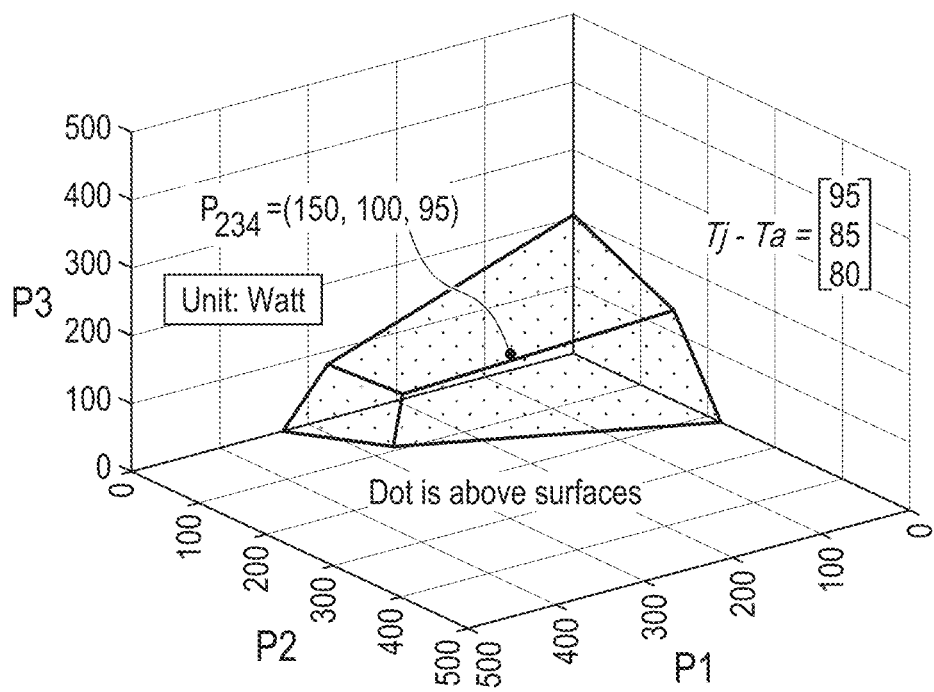

Another big advantage of using power envelope plots is the ease with which the maximum allowed temperature of the die can be changed to check if the chiplet module is reliable thermally. FIGS. 10a and 10b match the previous case from FIG. 6a, which has three die and $P_{234}$, to illustrate the application. Both FIGS. 10a and 10b use the same power magnitudes on the three die, which are 150, 100, and 95 watts, respectively. For FIG. 10a, the maximum allowed temperatures of three die are assumed to be at 125° C. as above, thus the difference between maximum allowed temperatures and ambient temperature, which is 30° C., are all 95° C. On FIG. 10b, the maximum allowed die temperatures are 125° C., 115° C., and 110° C. Thus, the difference between maximum allowed temperatures and ambient temperature are 95° C., 85° C., and 80° C. The shift of maximum allowed temperatures on the die causes a shrink of the size of bounded surfaces such that the selected set of powers moves from beneath the power envelope surfaces in FIG. 10a to above the surfaces in FIG. 10b.

Figure 11A:
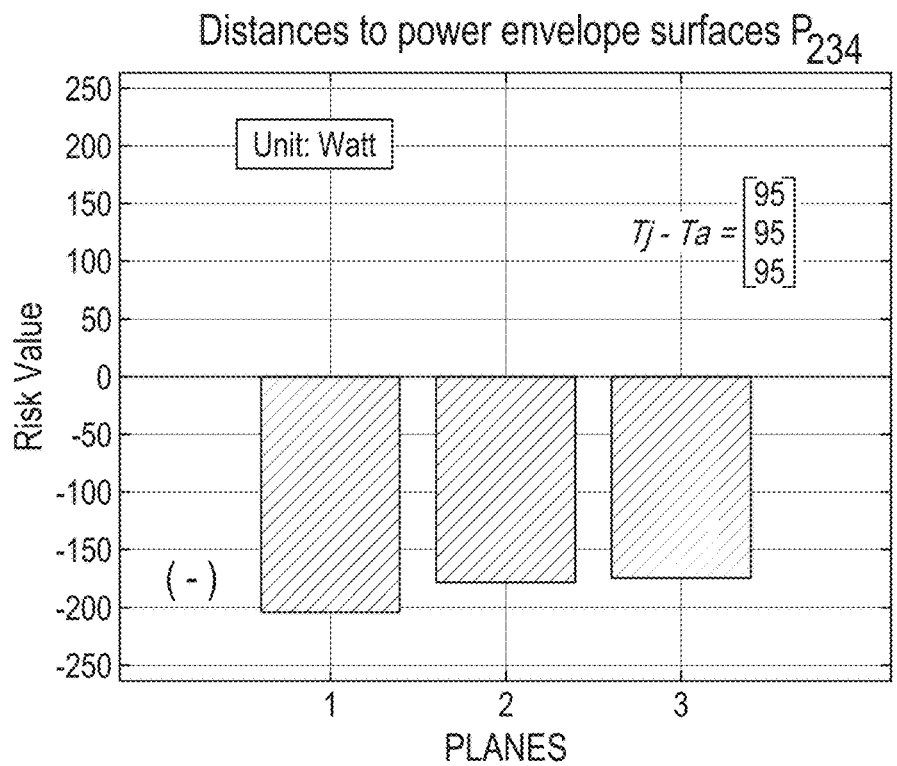
FIGS. 11a and 11b illustrate risk values when changing maximum allowed temperature.
Figure 11B:
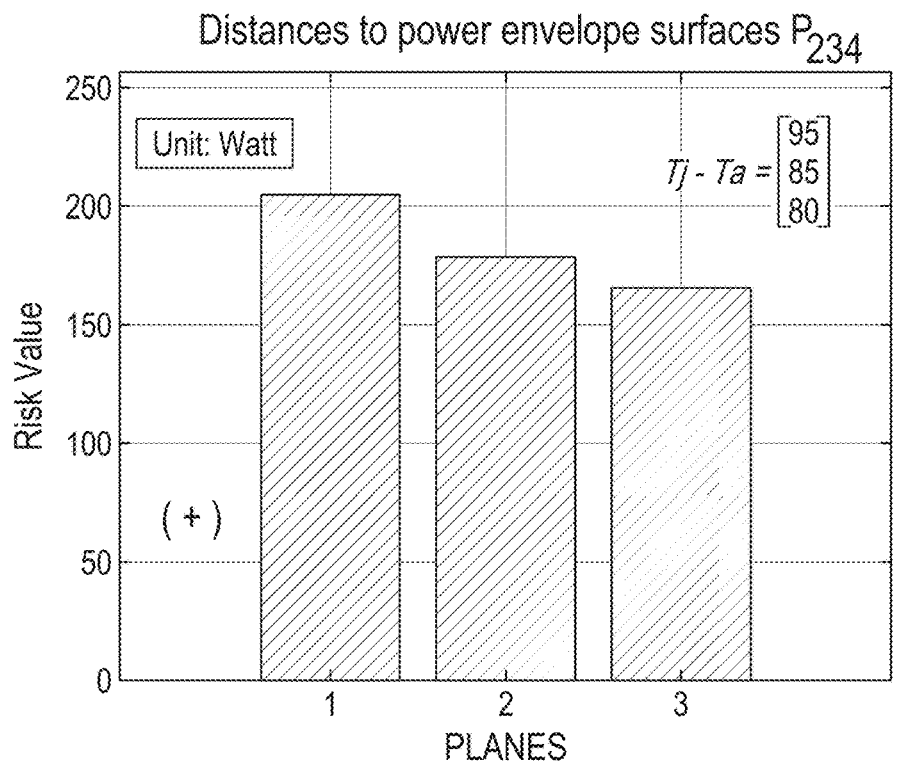

FIGS. 11a and 11b further illustrate the impact of changing the maximum allowed die temperatures in another format for the same example as FIGS. 10a and 10b. The thermal status of the chiplet module changes from a negative risk value in FIG. 11a, which is safe, to a positive risk value in FIG. 11b, which is risky.

The consideration of thermal design is not only a matter of junction temperatures of the die, but also relates to the materials or processes being used to manufacture the components. When different materials or processes are used, the maximum allowed junction temperatures of components will be changed as well. With the approach elaborated above, designers will be able to tweak the maximum allowed junctions to check the impact on the thermal reliability, especially from the viewpoint of power magnitudes.

Figure 12A:
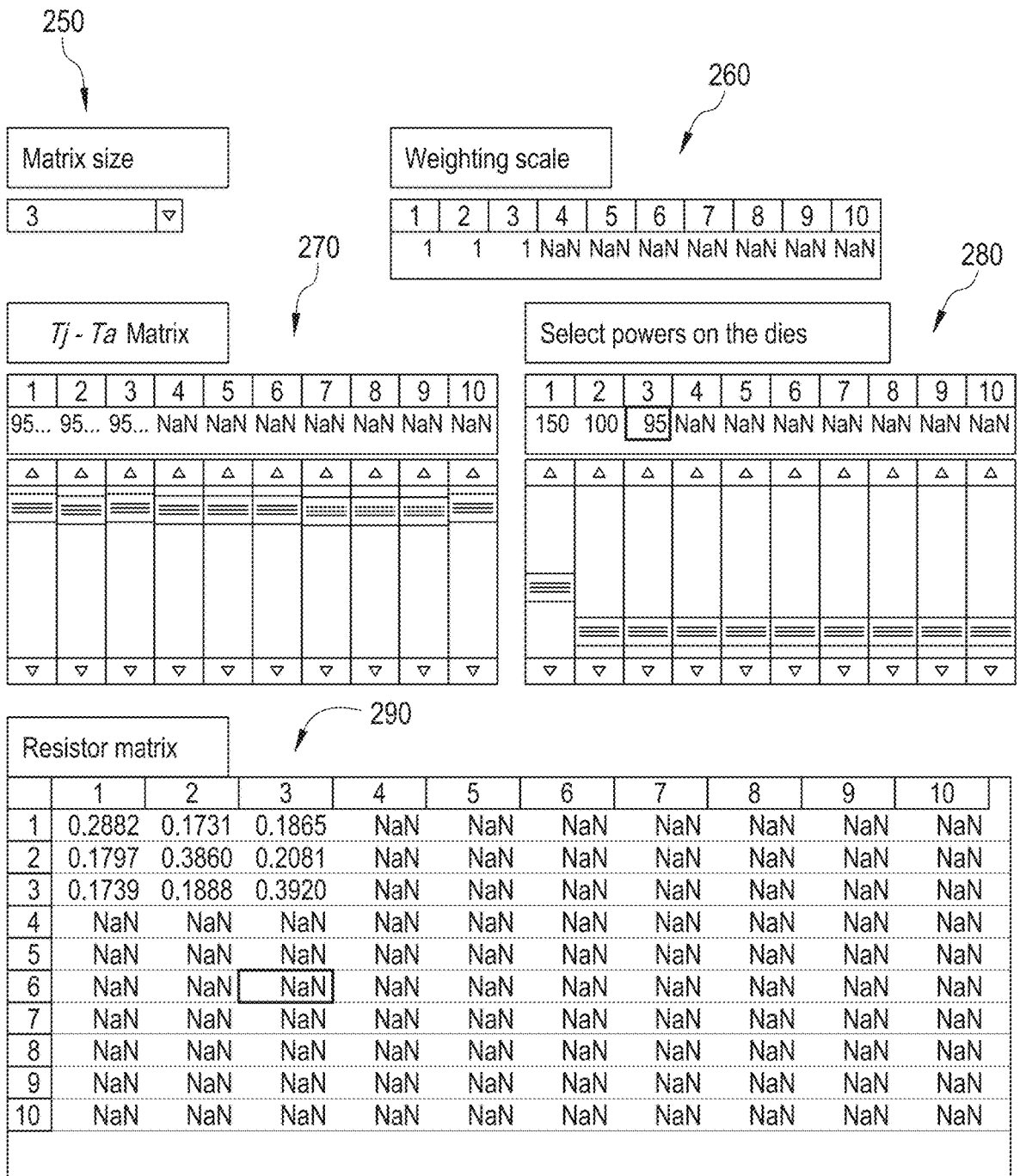
FIGS. 12a and 12b illustrate automation software for power envelope analysis.
Figure 12B:
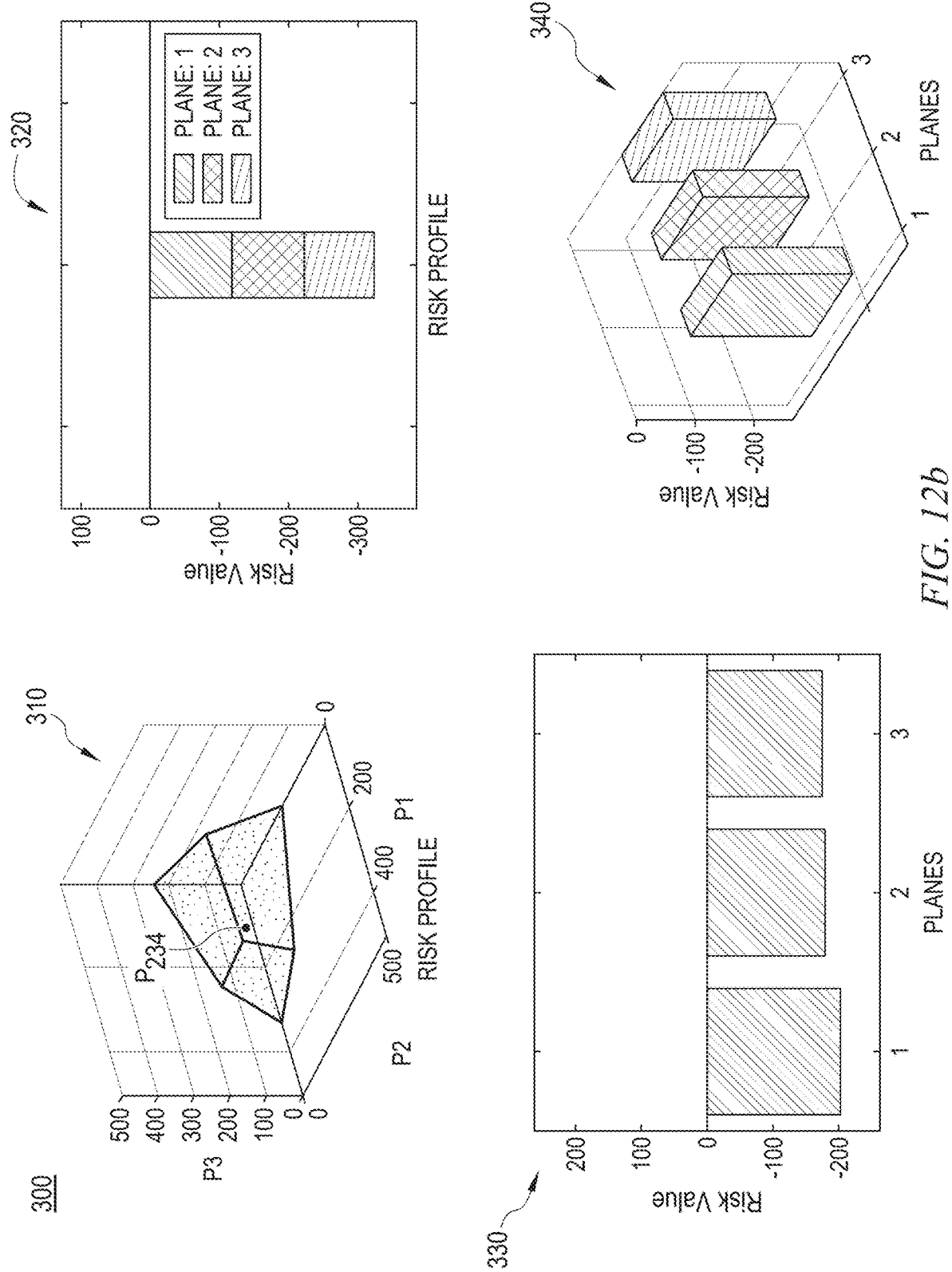

FIGS. 12a and 12b show an example from an automation tool to calculate the risk values of the chiplet modules. The matrix size is the first parameter to be defined in drop-down matrix size menu 250. The matrix size can be, e.g., 2×2, 3×3, 4×4, 5×5, 6×6, 7×7, or larger, to define the thermal resistor matrix size, which was explained in Equation (1). The weight scales, as explained in Equation (7) can be adjusted as well in weight scale configuration 260. The $(T_j - T_a)$ matrix is adjusted using sliders 270 according to the allowed specifications. Finally, a set of power magnitudes on the die can be selected with sliders 280. One of the advantages of the tool is that the $(T_j - T_a)$ matrix and selected powers on the die can be either manually entered or selected with sliding bars to adjust their magnitudes.

The resistor matrix 290 is automatically calculated based on the entered values. In addition, plots and graphs corresponding to those previously discussed can also be automatically generated as, e.g., a results page 300 in FIG. 12b. Results page 300 includes a power envelope surface plot 310, a combination risk value plot 320, individual risk value plots 330, and three-dimensional risk value plots 340. All the graphs on results page 300 are automatically generated based on the entered data. Both the screens from FIGS. 12a and 12b can be displayed together so that results page 300 can update in real time as input values are modified.

A unique power envelope plot was developed to analyze the thermal reliability of chiplet module. The risk values of selected power magnitudes of die were calculated to determine if the chiplet module is within the safe region. One of the advantages of this approach is that the focus is shifted from junction temperatures to risk values, which are the differences to the maximum allowed power levels of die so that circuit designers are able to adjust or optimize the magnitudes of die powers. An automation scheme can provide a quick approach to quantify the thermal risks of die on a chiplet module compared to prior art methods that required simulating $T_j$ values for each given change to a die power.

While the above demonstrates the use of power envelope plots to optimize the power magnitudes of the chips on a 2.5 D interposer having different numbers of chips, the same analytical approach can be used for other multi-die configurations such as multichip modules or 3D-stacked die.

Another advancement to address the concerns of non-uniform power distribution between die in a multi-die configuration is usage of a vapor chamber design inside the heat sink base. The higher power of the ASIC die causes a higher temperature at that side of the chiplet module, and the hot spot effect is obvious in FIG. 4, as the heat contours are concentrated within a smaller region over semiconductor die 104c. With an embedded vapor chamber, the temperature is more uniform.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of making a semiconductor device, comprising:
calculating a thermal resistance matrix for the semiconductor device;
selecting a plurality of maximum junction temperatures for a plurality of die of the semiconductor device;
calculating a plurality of power envelope surfaces for the semiconductor device based on the thermal resistance matrix and maximum junction temperatures;
selecting a plurality of powers for the plurality of die; and
comparing the plurality of powers against the plurality of power envelope surfaces to determine a plurality of risk values.

2. The method of claim 1, further including combining the plurality of risk values into an effective risk value by:
squaring each individual risk value of the plurality of risk values to acquire a plurality of squared values;
adding the squared values together to calculate a sum; and
taking the square root of the sum.

3. The method of claim 2, further including multiplying each of the squared values by a weighting scale prior to adding the squared values together.

4. The method of claim 1, further including:
selecting a second plurality of powers for the plurality of die; and
comparing the second plurality of powers against the plurality of power envelope surfaces to determine a second plurality of risk values.

5. The method of claim 1, further including:
selecting a second plurality of maximum junction temperatures; and
calculating a second plurality of power envelope surfaces for the semiconductor device based on the thermal resistance matrix and the second plurality of maximum junction temperatures.

6. The method of claim 1, further including calculating the thermal resistance matrix by dividing a matrix of a plurality of junction temperatures by a matrix of a second plurality of powers for the plurality of die, wherein the plurality of junction temperatures is determined by simulating the semiconductor device using the second plurality of powers.

7. A method of making a semiconductor device, comprising:
calculating a thermal resistance matrix for the semiconductor device;
selecting a plurality of maximum junction temperatures for a plurality of die of the semiconductor device;
selecting a plurality of powers for the plurality of die;
calculating a product of the thermal resistance matrix and a matrix of the plurality of powers; and
determining whether the product is less than a matrix of the plurality of maximum junction temperatures, and therefore the plurality of powers is thermally safe for the semiconductor device, or whether the product is greater than or equal to the matrix of the plurality of maximum junction temperatures, and therefore the plurality of powers is thermally risky for the semiconductor device.

8. The method of claim 7, further including:
calculating a plurality of power envelope surfaces for the semiconductor device based on the thermal resistance matrix and maximum junction temperatures; and
comparing the plurality of powers against the plurality of power envelope surfaces to determine a plurality of risk values.

9. The method of claim 8, further including combining the plurality of risk values into an effective risk value by:
squaring each individual risk value of the plurality of risk values to acquire a plurality of squared values;
adding the squared values together to calculate a sum; and
taking the square root of the sum.

10. The method of claim 9, further including multiplying each of the squared values by a weighting scale prior to adding the squared values together.

11. The method of claim 7, further including:
selecting a second plurality of powers for the plurality of die; and
calculating a second product of the thermal resistance matrix and a matrix of the second plurality of powers.

12. The method of claim 7, further including:
selecting a second plurality of maximum junction temperatures; and
determining whether the product is less than a second matrix of the second plurality of maximum junction temperatures.

13. The method of claim 7, further including calculating the thermal resistance matrix by dividing a matrix of a plurality of junction temperatures by a matrix of a second plurality of powers for the plurality of die, wherein the plurality of junction temperatures is determined by simulating the semiconductor device using the second plurality of powers.

14. A method of making a semiconductor device, comprising:
calculating a thermal resistance matrix;
selecting a plurality of powers for a plurality of die for the semiconductor device; and
determining whether the selected plurality of powers is thermally safe by multiplying a matrix of the plurality of powers and the thermal resistance matrix;
calculating a plurality of power envelope surfaces for the semiconductor device based on the thermal resistance matrix; and
comparing the plurality of powers against the plurality of power envelope surfaces to determine a plurality of risk values.

15. The method of claim 14, further including combining the plurality of risk values into an effective risk value.

16. The method of claim 15, applying a weighting scale to the plurality of risk values when combining.

17. The method of claim 14, further including:
selecting a second plurality of powers for the plurality of die; and
determining whether the second plurality of powers is thermally safe for the semiconductor device by multiplying a matrix of the second plurality of powers and the thermal resistance matrix.

18. The method of claim 14, further including:
selecting a plurality of maximum junction temperatures; and
comparing a product of the matrix of the plurality of powers and the thermal resistance matrix against a matrix of the plurality of maximum junction temperatures.

19. The method of claim 14, further including calculating the thermal resistance matrix by dividing a matrix of a plurality of junction temperatures by a matrix of a second plurality of powers for the plurality of die, wherein the plurality of junction temperatures is determined by simulating the semiconductor device using the second plurality of powers.

20. A method of making a semiconductor device, comprising:
  calculating a thermal resistance matrix;
  selecting a plurality of powers for a plurality of die for the semiconductor device;
  determining whether the selected plurality of powers is thermally safe by multiplying a matrix of the plurality of powers and the thermal resistance matrix;
  selecting a plurality of maximum junction temperatures; and
  comparing a product of the matrix of the plurality of powers and the thermal resistance matrix against a matrix of the plurality of maximum junction temperatures.

21. The method of claim 20, further including:
  calculating a plurality of power envelope surfaces for the semiconductor device based on the thermal resistance matrix; and
  comparing the plurality of powers against the plurality of power envelope surfaces to determine a plurality of risk values.

22. The method of claim 21, further including combining the plurality of risk values into an effective risk value.

23. The method of claim 22, applying a weighting scale to the plurality of risk values when combining.

24. The method of claim 20, further including:
  selecting a second plurality of powers for the plurality of die; and
  determining whether the second plurality of powers is thermally safe for the semiconductor device by multiplying a matrix of the second plurality of powers and the thermal resistance matrix.

25. The method of claim 20, further including calculating the thermal resistance matrix by dividing a matrix of a plurality of junction temperatures by a matrix of a second plurality of powers for the plurality of die, wherein the plurality of junction temperatures is determined by simulating the semiconductor device using the second plurality of powers.

* * * * *